(12) United States Patent
Hofmann

(10) Patent No.: US 6,418,372 B1
(45) Date of Patent: Jul. 9, 2002

(54) ELECTRONIC VISITOR GUIDANCE SYSTEM

(75) Inventor: Ingmar Patrick Hofmann, Berkeley, CA (US)

(73) Assignee: Siemens Technology-To-Business Center, LLC, Berkeley, CA (US)

( * ) Notice: Subject to any disclaimer, the term of this patent is extended or adjusted under 35 U.S.C. 154(b) by 0 days.

(21) Appl. No.: 09/519,674

(22) Filed: Mar. 6, 2000

Related U.S. Application Data

(60) Provisional application No. 60/172,847, filed on Dec. 10, 1999.

(51) Int. Cl.[7] ............................................. G01C 21/00
(52) U.S. Cl. ........................ 701/209; 701/207; 342/357
(58) Field of Search ................................ 701/207, 209; 342/357, 457; 340/825.49

(56) References Cited

U.S. PATENT DOCUMENTS

| | | | |
|---|---|---|---|
| 3,696,384 A | 10/1972 | Lester | 367/199 |
| 3,739,329 A | 6/1973 | Lester | 367/6 |
| 4,151,407 A | 4/1979 | McBride et al. | 359/158 |
| 4,225,953 A | 9/1980 | Simon et al. | 367/117 |
| 4,275,385 A | 6/1981 | White | 340/825.49 |
| 4,660,022 A | 4/1987 | Osaka | 340/384.3 |
| 4,935,907 A * | 6/1990 | Friedman | 367/118 |
| 5,144,294 A | 9/1992 | Alonzi | 340/825.49 |
| 5,470,233 A | 11/1995 | Fruchterman et al. | 434/112 |
| 5,495,357 A * | 2/1996 | Osterhout | 359/152 |
| 5,644,139 A | 7/1997 | Allen et al. | 250/557 |
| 5,806,017 A | 9/1998 | Hancock | 701/209 |
| 5,973,811 A | 10/1999 | Madey | 361/313 |
| 6,107,944 A * | 8/2000 | Behr et al. | 340/995 |
| 6,127,945 A * | 10/2000 | Mura-Smith | 340/988 |
| 6,164,531 A * | 12/2000 | Harris et al. | 235/380 |

FOREIGN PATENT DOCUMENTS

| | | |
|---|---|---|
| JP | H3216516 | 9/1991 |
| JP | 3216516 A | 9/1991 |
| WO | WO 94/27206 | 11/1994 |
| WO | WO 95/04440 | 2/1995 |
| WO | WO 99/06798 | 2/1999 |
| WO | PCT/US/00/33417 | 8/2000 |

OTHER PUBLICATIONS

KTH University of Sweden, SmartGuide Specification "An indoor information and navigation system", http:www.it-.kth.se/~d93–jsv/mpc/smartguid.html, printed Dec. 6, 1999, 16 pages.

Beadle, H.W. Peter, et al., "Location Aware Computer Systems", http://www.elec.uow.edu.au/people/staff/beadle/badge/location_aware.html, Feb. 22, 1997, 5 pages.

Beadle, H.W. Peter, et al., "Dumb Badge", http://www.elec-.uow.edu.au/people/staff/beadle/badge/badge/dumb_badge.html, Mar. 10, 1997, 3 pages.

* cited by examiner

*Primary Examiner*—William A. Cuchlinski, Jr.
*Assistant Examiner*—Marthe Y. Marc-Coleman

(57) ABSTRACT

A low-cost guidance system for guiding a user to a selected one of multiple locations in a defined area. The system includes a portable device per user and multiple indicators. The portable device includes an infrared transceiver and an input to receive information corresponding to a selected location in the defined area. An indicator includes an indicator infrared transceiver, direction signs, and directional information corresponding to the relative direction in a path from the indicator to each of the locations. The portable device directly communicates the information corresponding to the selected location via the device infrared transceiver to the indicator infrared transceiver of the indicator to cause the indicator to access the directional information and activate the appropriate direction sign to guide the user toward the selected location. Thus, the low cost, easy-to-use system helps people find their way around big public or private places including trade shows, warehouses, airports, libraries, museums, and shopping malls.

31 Claims, 8 Drawing Sheets

ELECTRONIC VISITOR GUIDANCE SYSTEM

CROSS-REFERENCE TO RELATED APPLICATIONS

The present application claims priority from U.S. provisional patent application No. 60/172,847, entitled "Electronic Visitor Guidance System" filed on Dec. 10, 1999 and having inventor Ingmar Hofnann.

BACKGROUND

At large events like fairs, conferences or trade shows and big places like shopping malls, airports, superstores, universities, industrial plants, amusement parks, museums, or libraries, people have to find their way around these facilities with little or no prior knowledge about the location. For orientation, most public places display signs and maps to help the visitor find his way. Although signs can be very helpful for finding the way, they are typically limited to indicating often-used routes. If signs at any given place show too many possible points of interest (for example, every booth at a trade show), the user may be overwhelmed with information he does not immediately need. Moreover, maps that show all the possible points of interest can be complicated to use. The user has to figure out his position and orientation on the map, find the location of his destination on the map, plan a (possibly non-optimal) route to the destination, and (in case of stationary maps) memorize the path to the destination. Then, the user actually has to navigate the planned route within the real world. Additionally, portable paper maps, especially larger ones that have to be unfolded prior to use, can be cumbersome to use.

A few places (like museums) have human guides who lead the way based on their knowledge of the place. However, human guides are expensive and therefore rare.

Some places, like computer fairs, feature manned or computerized information kiosks that display or print the location of the visitor's destination on a screen or on paper. Information kiosks do not really guide people—they merely provide customized maps, with all the problems mentioned above.

Various conventional location systems have been proposed that can identify and locate specific users or locations. For example, the well known global positioning system (GPS) uses radio or microwave frequency signals sent from various satellites to provide locational information of a GPS receiver, which may be mobile. Other systems have used ultrasonic frequency, radio or microwave frequency, or infrared transmissions to locate specific transceivers, such as carried by users, which may be mobile. However, these types of conventional systems involve complex equipment and are too expensive to implement for local guidance area systems, especially for guidance areas that may be constantly changing or exist only for a specified time period (for example, traveling trade shows).

One such conventional local guidance system that has been proposed includes smart badges worn by users, information stations located throughout the guidance area, and electronic direction signs also located throughout the area. The smart badges include identification information about the specific user that is transmitted via infrared communications. The information stations and electronic direction signs are connected to a network and a shared database. The information station is a device where the user sets his preferences, display and order information according to these preferences or finds information about the place the user is visiting. The electronic direction sign communicates with the smart badge of the user in the electronic direction sign's proximity, and shows the user based on the identification information in the user's smart badge the nearest way to the particular destination that was previously chosen by the user at the information station. This kind of system requires several information stations which must be used with the smart badges, and these information stations can include fairly expensive equipment and require additional installation time. Moreover, as this system relies on a shared central database, all of the electronic direction signs must be networked, which contributes to the expense and complexity of the system. In addition, failures of the database or network may significantly inhibit, or even prevent, such a system from functioning.

It is seen from the above that a simpler, more economic alternative to a guidance system to efficiently facilitate guidance of human users in a localized area is desirable.

SUMMARY OF THE INVENTION

The present invention is easier to use than maps and provides a low overhead way to quickly find a destination in the real world. The present invention helps people orient themselves in such surroundings by guiding them along a path to a selected location of their choice. Cheaper than a human guide and other conventional locational guidance systems, the invention is easy to use—once the user specified his destination, he only has to follow the direction indicated by the arrows. The present invention provides only the information the user needs at the time he needs it.

According to a specific embodiment, the present invention provides an infrared guidance system for guiding a user to a selected one of multiple locations in a defined area. The system includes a portable device and an indicator. The portable device includes an infrared transceiver and an input to receive information corresponding to a selected location in the defined area. The indicator includes an indicator infrared transceiver, direction signs, and directional information corresponding to the relative direction in a path from the indicator to each of the locations. The portable device directly communicates the information corresponding to the selected location via the device infrared transceiver to the indicator infrared transceiver of the indicator to cause the indicator to access the directional information and activate the appropriate direction sign to guide the user toward the selected location.

According to another specific embodiment, the present invention provides a method for guiding a user to a selected one of multiple locations in a defined area. The method includes the steps of receiving at the portable device input information corresponding to the selected one of the locations, and sending an infrared transmission corresponding to the input information from the portable device to an indicator. The indicator includes an indicator infrared transceiver, direction signs, and directional information corresponding to the relative direction in a path from the indicator to each of the locations. The method also includes the steps of receiving the infrared transmission at the indicator when the infrared transmission is within range of the indicator infrared transceiver, accessing the directional information corresponding to the relative direction in a path from the indicator to the selected one of the locations, and activating the appropriate direction sign of the indicator to guide the user toward the selected location. The infrared transmission receiving step causes the accessing step.

These and other specific embodiments of the present invention are described in more detail below in conjunction with the following drawings.

DETAILED DESCRIPTION OF SPECIFIC EMBODIMENTS

Figure 1:
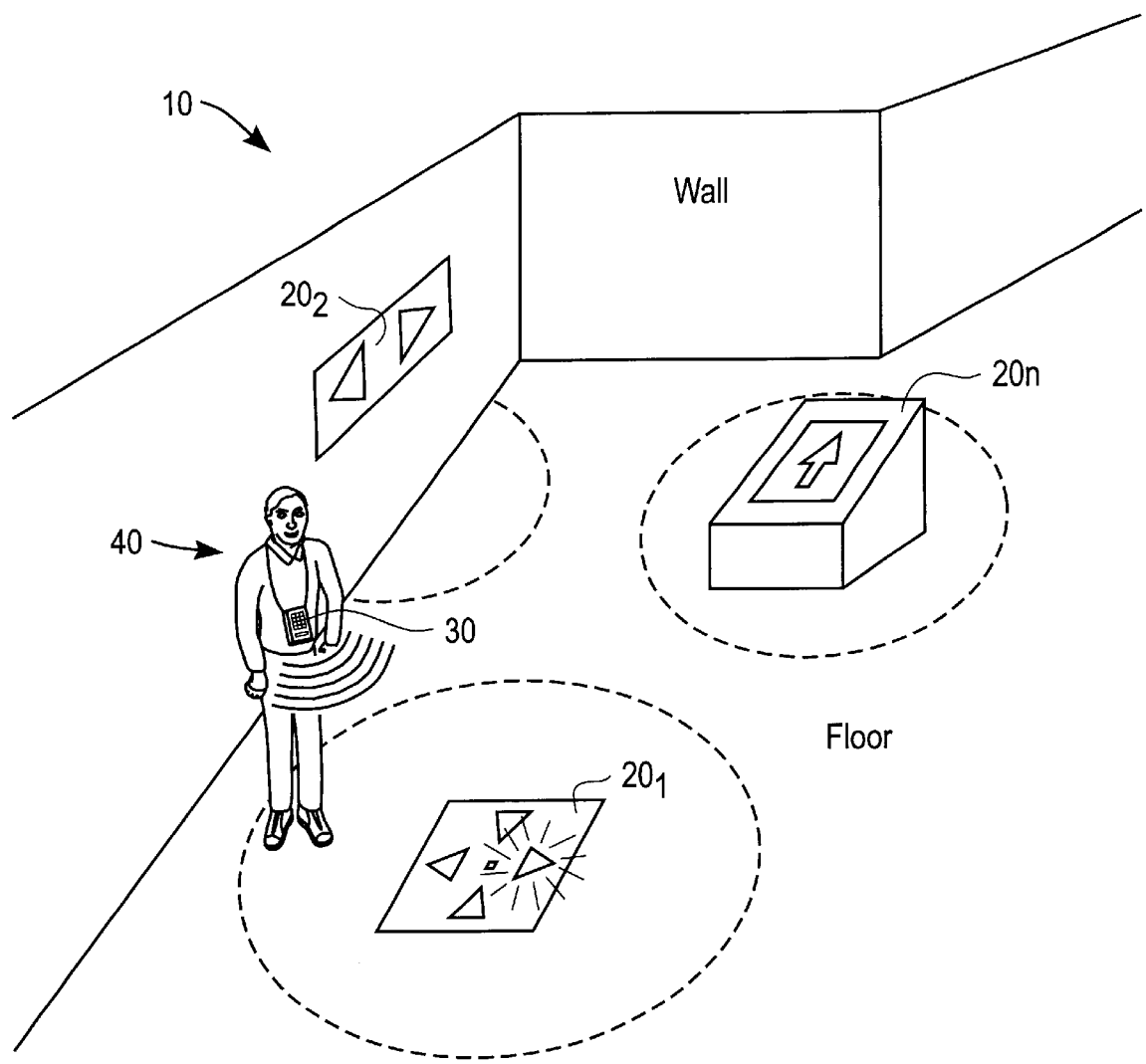
FIG. 1 shows a system 10 that includes mountable indicators $20_1$, $20_2$, and at least one portable device 30 for use in the defined guidance area that contains various locations selectable by the user, in accordance with the present invention.

As seen in FIG. 1 (which is not to scale), the present invention provides a system 10 that includes mountable indicators $20_1$, $20_2$, ... $20_n$ and at least one portable device 30 for use in the defined area that contains various locations selectable by a user 40. The indicator 20, which includes an infrared transceiver, is a preferably flat sign panel that can be mounted to a wall or the floor or any surface. For example, arrow shaped lights can be used to indicate directions ("go left", "go right", "go straight", "go backwards"). The user 40 inputs into portable device 30 the specific location to which he wishes to be guided by the system. If the user equipped with that portable device comes into the vicinity or range (shown by dotted lines in FIG. 1) of an indicator 20, the particular indicator will, for example, light up a sign telling the user which direction to take to his specified destination.

Figure 2A:
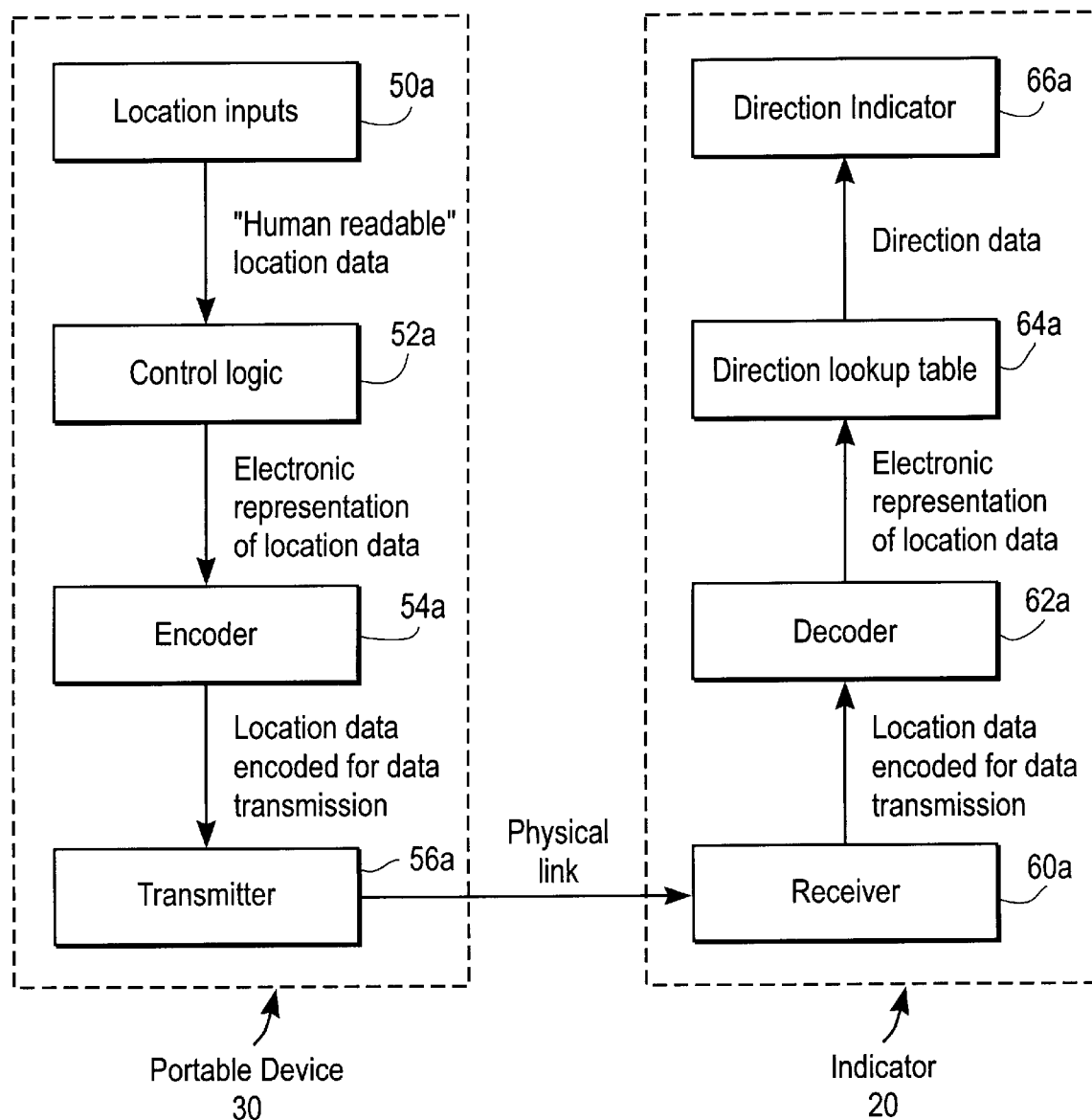
FIG. 2A is a simplified functional block diagram of a portable device and an indicator, in accordance with the present invention.

Generally, FIG. 2A is a simplified functional block diagram of a portable device and an indicator, in accordance with the present invention. As seen in FIG. 2A, portable device 30 includes a location input 50a, an encoder 54a, a data transmitter 56a, and a power source (not shown) such as a battery. Indicator 20 includes a data receiver 60a, a decoder 62a, a "direction generator" 64a such as a direction lookup table or a directional data generating routing algorithm, a direction indicator 66a, and a power source (not shown) such as a battery or an interface to a power outlet. The user starts the guidance process by specifying the location to which he wishes to be guided. The location input 50a translates the location data into an electronic representation readable by encoder 54a. Encoder 54a then encodes the location data into a format suitable for transmission by transmitter 56a via a data link to an indicator 20. Receiver 60a receives the transmitted encoded location data and relays it to decoder 62a, which decodes the transmitted encoded location data into an electronic representation of the location data. The "direction generator" 64a utilizes the location data to generate appropriate direction data, which is then provided to direction indicator 66a to signal the appropriate direction to the user.

Figure 2B:
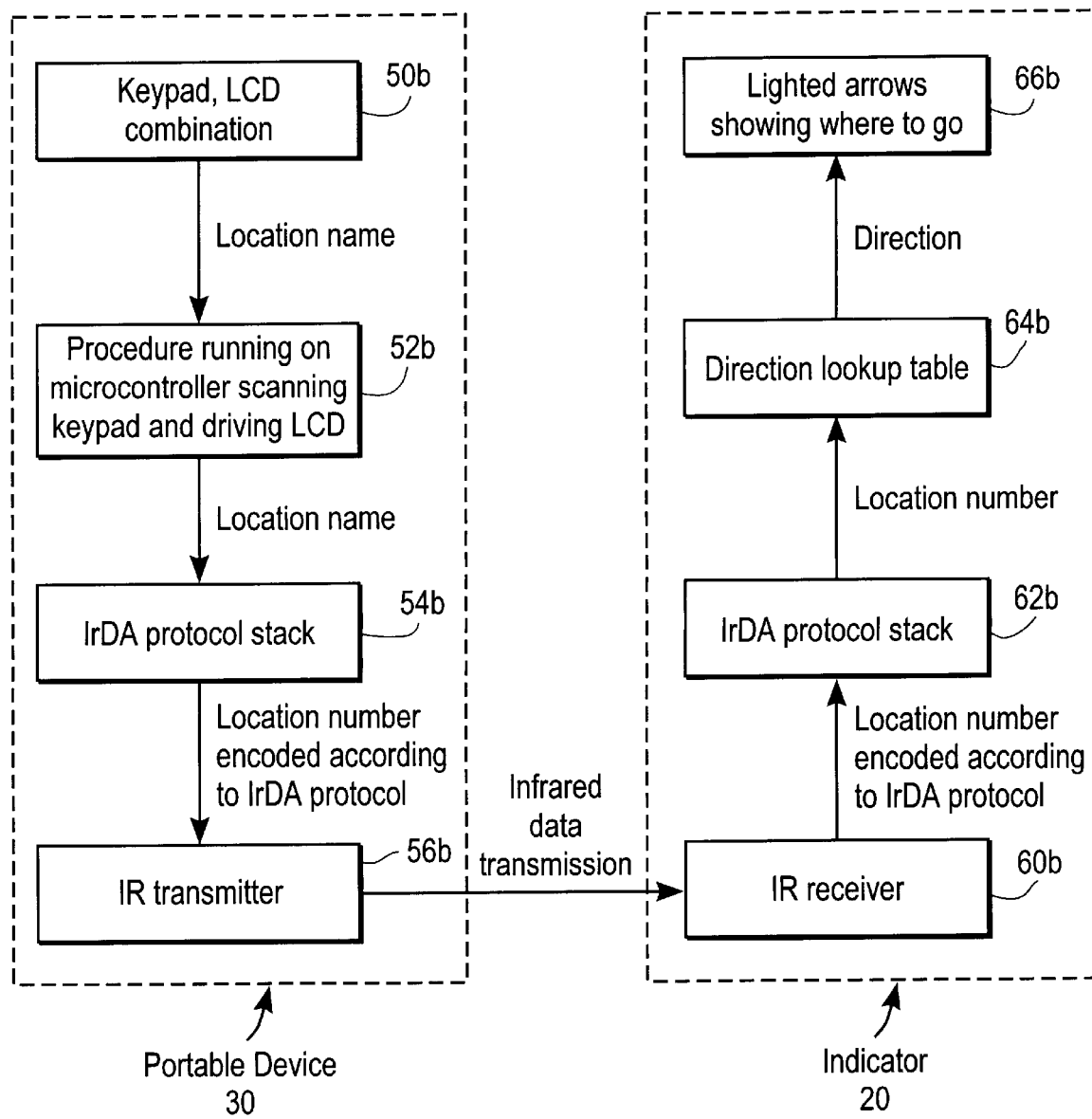
FIG. 2B is a simplified functional block diagram of a portable device and an indicator, in accordance with a specific embodiment of the present invention.

FIG. 2B is the simplified functional block diagram of a specific embodiment. In this specific embodiment, portable device 30 includes a user interface consisting of a keypad and display (such as a numeric liquid crystal display (LCD)) for location input/output 50b, an IrDA protocol stack encoder 54b, an IrDA physical layer compliant infrared transceiver 56b, and a battery (not shown). Indicator 20 includes an IrDA physical layer compliant infrared transceiver 60b, an IrDA protocol stack decoder 62b, an internal direction lookup table 64b (e.g. using location data stored in an EEPROM (electronically erasable programmable read only memory)), and lighted arrows 66b (which may be a LED (light emitting diode) array which can display arrows) showing the user where to go. The indicator 20 is hooked up to a power source. In this specific embodiment, the user starts the guidance process by entering into the keypad location data (e.g., a location name or a location number) corresponding to the location to which he wishes to be guided. The location data (in this embodiment, a location number) entered is then transformed into a stream of data packets complying to the IrDA protocol by the IrDA protocol stack 54b, and then is sent to indicator 20 in an IrDA physical layer compliant infrared data transmission by infrared transceiver 56b. Infrared transceiver 60b of indicator 20 receives the infrared data transmission that is then decoded by the IrDA protocol stack 62b, Through the direction lookup table 64b in a specific embodiment, the decoded location number is transformed into directional information. Direction indicator 66b uses this direction data to display an appropriate direction arrow for the user to follow.

Figure 3A:
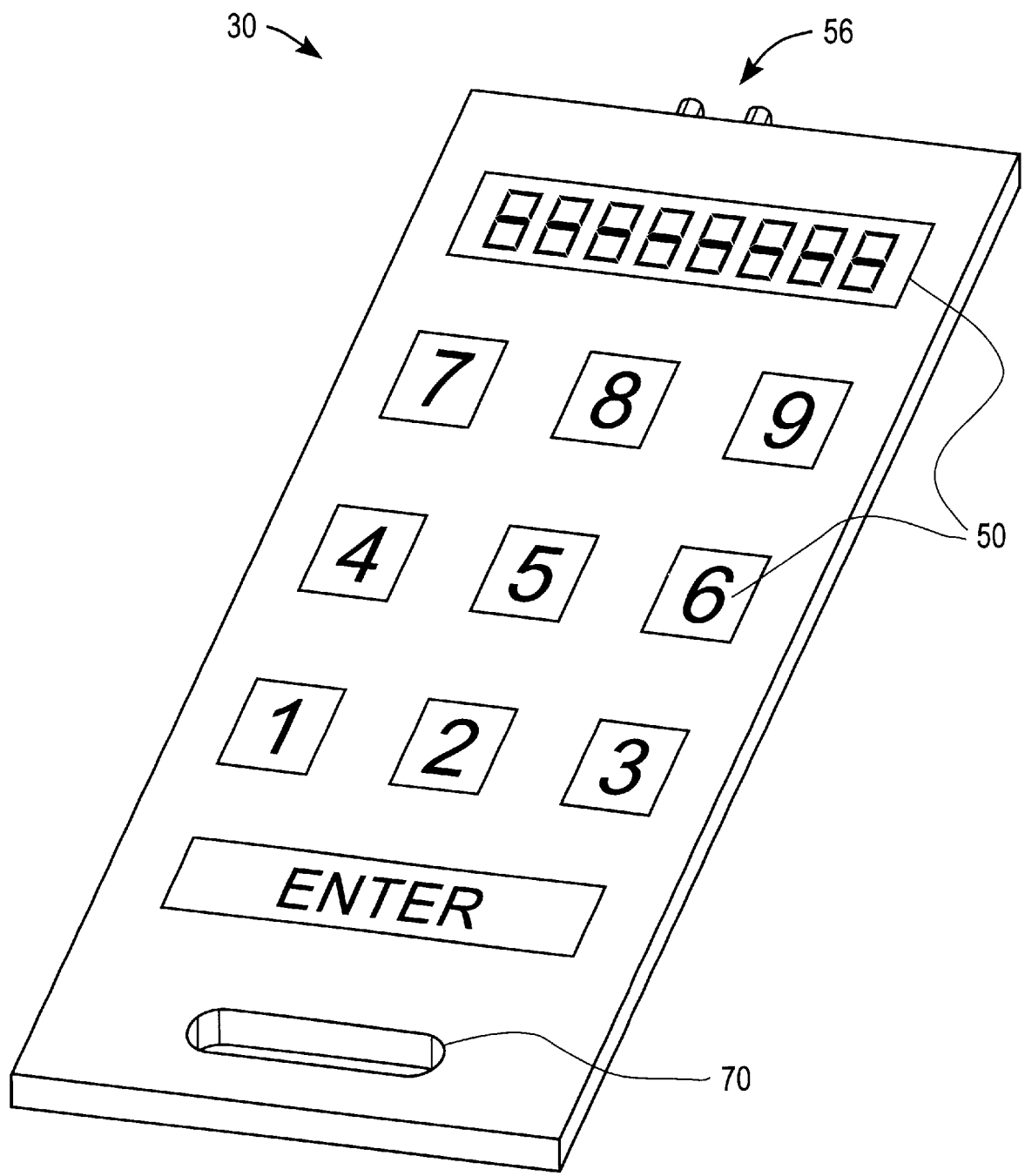
FIG. 3A is a portable device in the form of a badge having a transceiver, keypad input and display, in accordance with a specific embodiment of the present invention.

According to a specific embodiment, as seen in FIG. 3A (which is not to scale), portable device 30 can be built in the form of a credit card-sized ID badge or other inexpensive device that is similar in size and weight to a small pocket calculator or small TV remote control-like device. This specific embodiment of portable device 30 has an infrared transceiver 56, a location input mechanism 50 consisting of a keypad and a display. The encoder and battery internal to device 30 are not shown in FIG. 3A. The display may be a liquid crystal display (LCD) or other display, in accordance with specific embodiments. In some embodiments, the portable device may be attached to a badge holder, a strap, a belt holder, or other holding device for convenience, and may include a mounting hole or attachment mechanism 70.

Figure 3B:
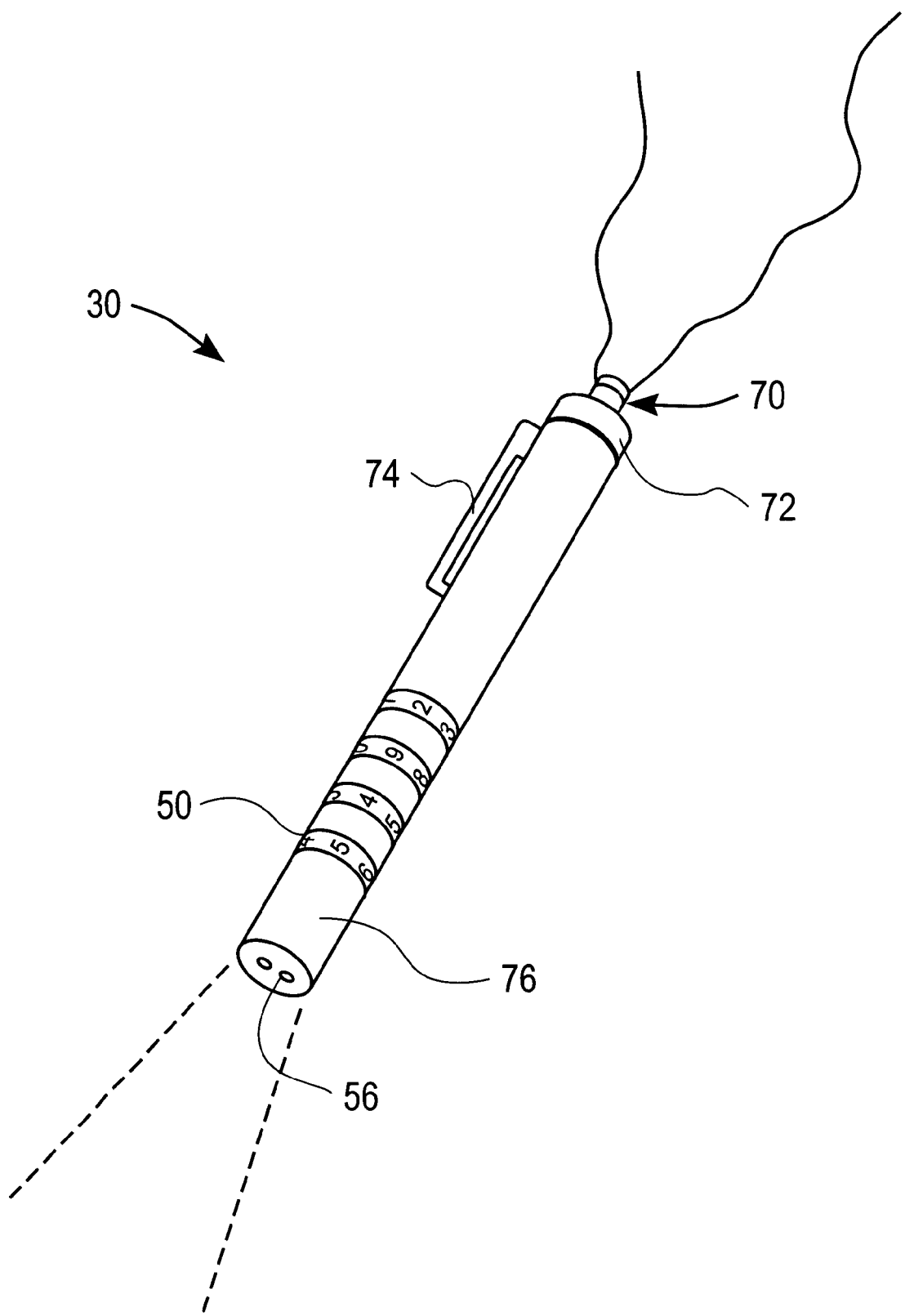
FIG. 3B is a portable device in the form of a pen-like device having a transceiver and an input mechanism, in accordance with a specific embodiment of the present invention.

According to another specific embodiment, FIG. 3B illustrates a portable device 30 in the form of a pen-like device having an infrared transceiver 56 and a location input mechanism 50, such as numbered thumbwheel switches. Device 30 also includes an internal battery which may be accessed via a removable battery compartment cap 72, which can also include an attachment mechanism 70. The pen-like device 30 can also be attached to e.g. a jacket with a pen clip 74. The pen-like device 30 may optionally be equipped with an acknowledgment signal 76 which emits an audible, visible or tactile signal when the indicator 20 contacted by the portable device 30 indicates in which direction the user has to proceed. In this embodiment of the invention the acknowledgment signal 76 is a LED capable of emitting visible flashes. Other embodiments may include a piezoelectric buzzer emitting audible beeps, or other signaling devices. The acknowledgment signal 76 accomplishes two aims: a) the user knows that the directions indicated by an indicator 20 in his vicinity are meant for him—if they are meant for someone else's portable device 30 his device will remain silent/inactive—and b) the signals remind the user to switch the device off when not in use in order to extend the battery life.

In a specific embodiment such as that of FIG. 3A, the list of locations and their respective location codes can be printed on the back of portable device 30. In another embodiment such as that of FIG. 3B, a card or a brochure with a list of locations and location codes can be carried by the user together with the pen-like device 30, or the user can look up location codes printed on stationary overview maps or floor plans in his vicinity. Therefore, according to the above specific embodiments, the user specifies the location by pressing or actuating a number button/switch (or multiple number buttons/switches) on a keyboard or keypad or other input mechanism of portable device 30 to enter a code (or the location itself) representing a particular location. In other embodiments, the code or location can be entered into device 30 by reading a machine readable label, such as a barcode, containing the code or location, or by verbally stating the code or location into a portable device equipped with a speech recognition system. According to various embodiments, the particular location that is selected can be shown on a display such as a LCD (such as in FIG. 3A), or announced using speech synthesis technology in device 30.

As discussed above, multiple indicators 20 are used, with each indicator located or mounted in a different place within the total area covered by the guidance system of the present invention. If user 40 enters the vicinity or range of an indicator $20_i$, the user's portable device 30 transmits the location information previously entered by the user to that indicator. The infrared transceiver in that indicator receives the coded information supplied by portable device 30 and decodes it using location and direction data available internal to the indicator to provide a signal indicating the appropriate direction for the user to take next. According to specific embodiments, the structure and function of indicators 20 are described further below.

Figure 4:
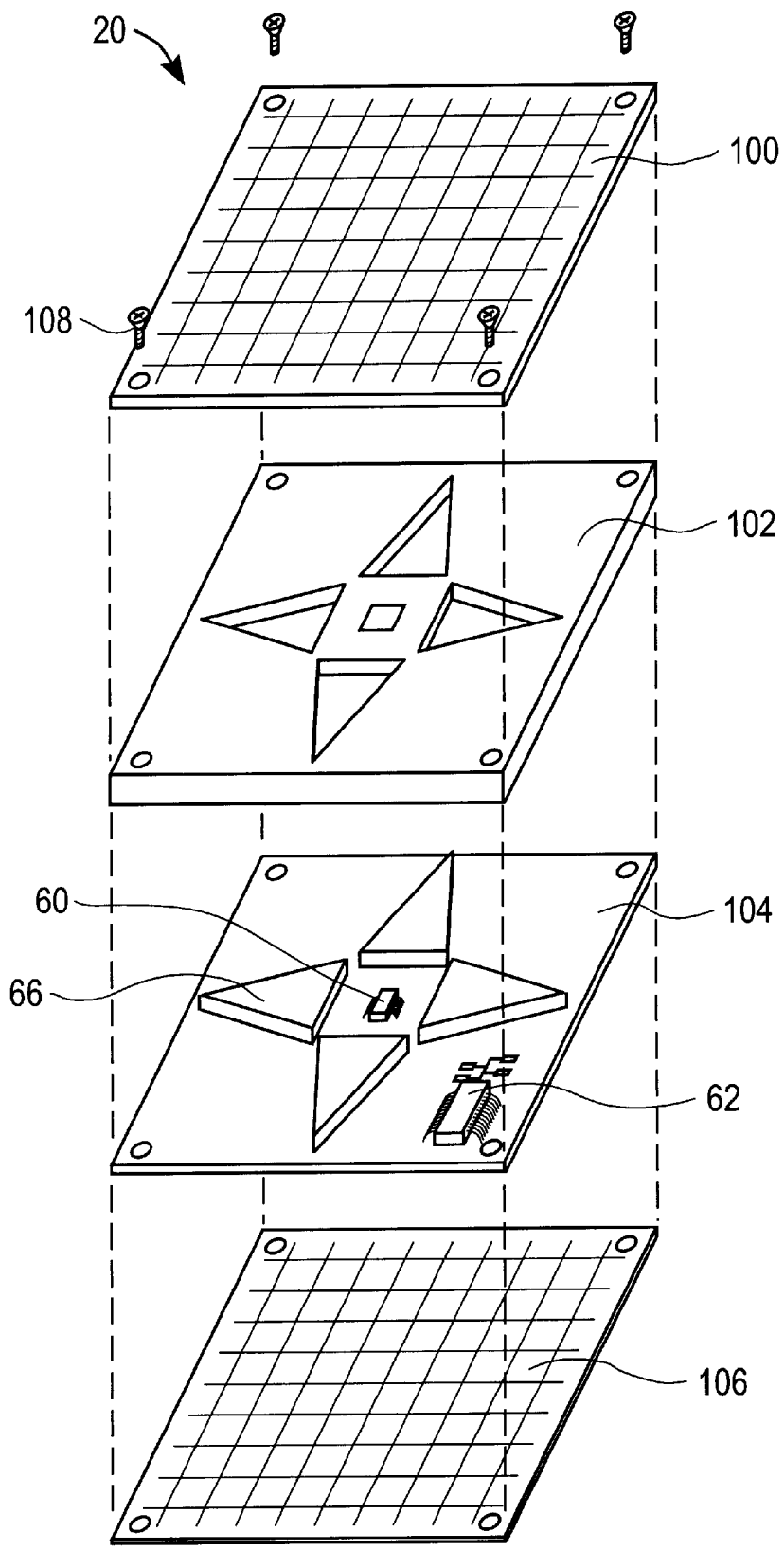
FIG. 4 is an exploded view of an indicator in accordance with a specific embodiment of the present invention.

FIG. 4 is an exploded view of an indicator 20 in accordance with a specific embodiment of the present invention. In this embodiment, indicator 20 includes a transparent cover 100, such as a rugged and durable heavy transparent plastic, that provides protection to the internal components and circuitry of the indicator. Under cover 100 is disposed a spacer 102, made of a thick, rigid, insulating plastic or other material, having appropriately shaped cut-outs to accommodate the indicator's internal circuitry and other components underlying spacer 102. Disposed under spacer 102 is a printed circuit board 104 that serves as the platform upon which the indicator's infrared transceiver 60, control logic 64 (such as a microcontroller containing a location lookup table 64b), and direction indicators 66 are connected. Printed circuit board 104 also includes printed circuit line connections thereon for the various electrical connections between the above discussed electronic circuitry and components. This electronic circuitry and components, including direction indicators 66, on top of printed circuit board 104 thus fit snugly into the corresponding cut-outs in spacer 102, which is thick enough to accommodate the height of the electronic circuitry and components.

In various embodiments, direction indicators 66 may be incandescent lamps, or a shaped series of LEDs. In a specific embodiment, direction indicators 66 are, for example, 8 LED segments, with each segment consisting of 9 super-bright LEDs and with the 8 segments being arranged in a way to display arrows of desired length pointing to 4 directions. In specific embodiments, the indicator also can display a rough estimate of the remaining distance to the selected destination by lighting up a shorter or longer arrow. An indicator does not necessarily need to use LEDs as outputs, or arrows to indicate a direction. In other embodiments, direction indicators are provided with dot-matrix displays, electro-luminescent shaped pads, projected images, a computer monitor, mechanical indicators, or a speech synthesizer.

As seen in FIG. 4, underneath printed circuit board 104 is an insulating plate 106 that is connected to the ground or other surface upon which indicator 20 is mounted. Insulating plate 106 provides insulation against static electricity to protect the indicator's electronics. Each of the layers 100, 102, 104, and 106 of indicator 20 have holes disposed therein at appropriate locations such that fasteners 108, such as screws, may secure these layers to the ground or mounting surface. In addition to transceiver 60, control logic 64 containing a location lookup table 64b, and direction indicating circuitry and components 66, indicator 20 also has a power source therein. In various specific embodiments, an indicator may use a battery source, solar energy, or be line powered by a conventional power outlet, or use a combination of power sources. In some specific embodiments, indicator 20's control logic 64 may include a location routing algorithm or procedure, instead of a location lookup table. The various layers 100, 102, 104 and 106 of indicator 20 are preferably mounted to the ground or other surface such that the top of cover 100 is flush to the ground or mounting surface, when the ground or mounting surface is capable of being walked upon.

In accordance with a specific embodiment, once the user has entered the desired location into portable device 30, the portable device continuously or periodically transmits a unique binary code corresponding to that location (e.g., ASCII code) using a modulated infrared protocol such as IrDA. When a different desired location is selected, the portable device stops transmitting the previous location code and starts transmitting the new location code. When the portable device is turned off, the transmissions end. In this specific embodiment, each indicator waits to receive an infrared data transmission that comes within the indicator's range of reception. When an indicator receives valid location information or location code from a portable device, the indicator looks up the location information/code in the indicator's lookup table containing the "optimal" direction a user should take for each location, relative to the indicator's location. In an alternate specific embodiment, the indicator uses its location routing algorithm to calculate the "optimal" direction. After the lookup or location routing algorithm execution, the indicator then causes the appropriate direction indicator to activate so that the user is informed of the appropriate direction for the optimal path to be taken in order to reach the selected location.

In some specific embodiments, the "optimal" direction is the direction causing the user to take the shortest way to the destination. In other specific embodiments, the "optimal" direction could be the direction that causes the user to take the fastest, easiest, nicest, safest, most instructive or cheapest way to the location. The locations can be defined according to the specific application or use of the present invention. For example, the locations could be restrooms, public phones, and exhibitors' booths when the present invention is used as a guidance system at a trade show or fair.

The lookup table in the indicator also can contain additional information about each location. For example, the distance from the portable device (which is at approximately the same location as the accessed indicator) to the given location can be accessed if desired.

Figure 5:
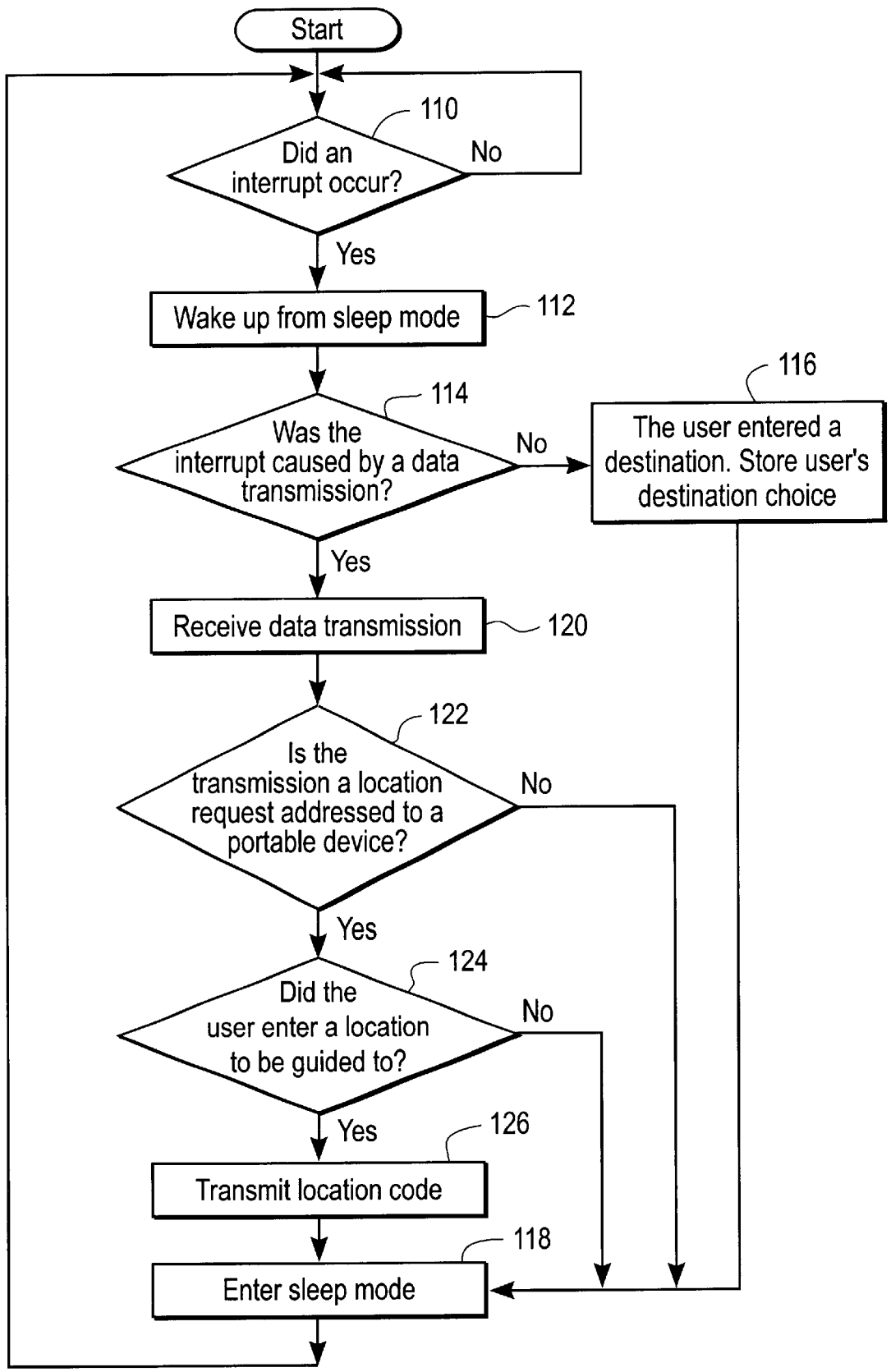
FIG. 5 is a flow diagram illustrating the operation of a portable device capable of two-way communication, in accordance with a specific embodiment of the present invention.
Figure 6:
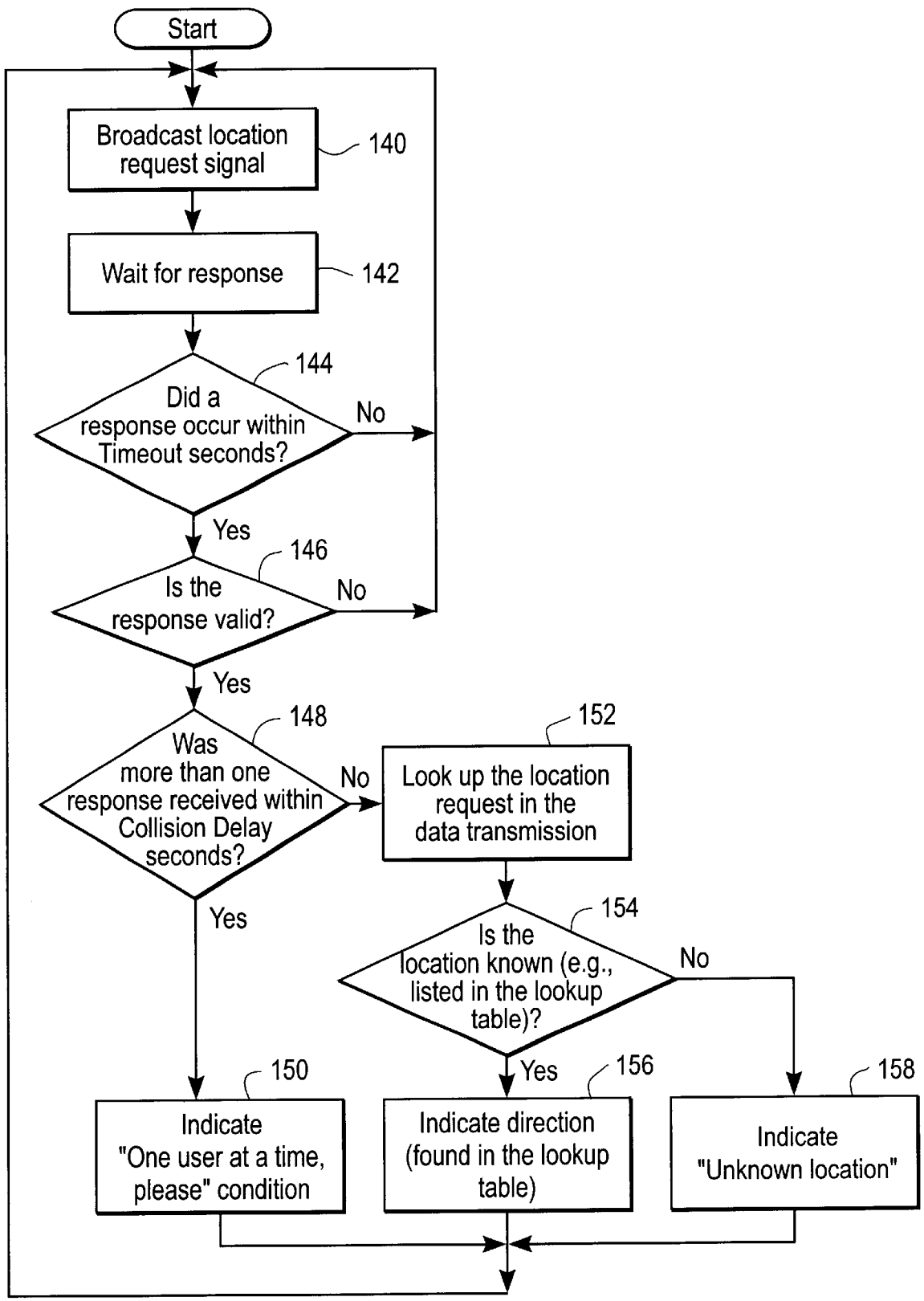
FIG. 6 is a flow diagram illustrating the operation of an indicator capable of two-way communication, in accordance with a specific embodiment of the present invention.

In another specific embodiment, each indicator may periodically transmit (e.g., every 500 milliseconds) an infrared signal, to which any portable device in the receiving range will respond by sending a location code to that indicator. When a user and his portable device enter the proximity of an indicator and the portable device's selected location code is transmitted to that indicator, the indicator displays the proper direction in which to continue. In a crowded place like a trade show, many people equipped with portable devices will use the guidance system at the same time. As long as no more than one person uses an indicator a time, no problem occurs. If two or more people try to use the same indicator, collisions of the transmitted location codes may occur. The specific embodiment reduces this problem by having the indicator detect and signal collisions. FIGS. 5 and 6 are flow diagrams illustrating the respective operation of a portable device 30 and an indicator 20, in accordance with this specific embodiment.

As seen in FIG. 5, a portable device 30 is typically in a sleep mode. Once portable device 30 senses in step 110 that an external event (for example, a hardware interrupt on a microcontroller) has occurred, portable device 30 wakes up from its sleep mode in a step 112. In a step 114, portable device 30 then determines if the interrupt was caused by a data transmission to device 30. If the interrupt was not caused by a data transmission, then the interrupt was caused by the user of portable device 30 entering a desired destination location, which is stored in a step 116. Then, device 30 returns to the sleep mode in a step 118. However, if the interrupt was caused by a data transmission, portable device 30 determines in a step 120 whether the user previously has entered a destination location to which he wishes to be guided. If device 30 does not have a desired destination location stored in its memory, then device 30 returns to sleep mode in step 118. However, if a desired destination location is stored, then device 30 receives the data transmission in step 122. In a step 124, portable device 30 determines if the data transmission is a location request originating from an indicator 20 addressed to a portable device 30, or a data transmission not directed to it. If the data transmission is not a location request (for example, a stray data transmission from a different non-system device using the same communications medium, like the command codes of a remote control), then portable device 30 ignores this transmission and returns to sleep mode in step 118. If the request for location data is addressed to it, portable device 30 transmits the location code in a step 126 and then returns to sleep mode in step 118.

As seen in FIG. 6, an indicator 20 typically is broadcasting a signal requesting destination codes in a step 140. In step 142, indicator 20 collects all responses to that request occurring within a specified period of time. In step 144, indicator 20 discards all responses containing invalid data (like messages addressed to other non-system system devices using the same communications medium). The remaining responses (if there are any at all) contain valid information describing the destination to which the users wish to be guided. This information is hereinafter referred to as "direction request", as the reason for transmitting the destination data is to obtain the direction to that destination. In step 146, indicator 20 determines if there is at least one valid direction request left. If there are no direction requests left to process, the indicator returns to step 140 and broadcasts another request. If there is at least one direction request left, the indicator 20 determines in step 148 the directions requested from the destination codes transmitted. In a specific embodiment, the indicator uses a lookup table for that purpose, containing a list of known locations and the direction in which to proceed in order to reach that destination. A different embodiment utilizes a location routing algorithm running on the indicator 20, thus reducing the amount of data stored in the indicator but needing more computational power. If the indicator 20 encounters an unknown destination during this process, it marks the corresponding direction as "unknown". In step 150, indicator 20 reduces multiple occurrences of the same direction to one. In other words, if two or more people try to use an indicator at the same time, the control logic on the indicator checks whether the users are all headed toward the same direction. If they are, for example, people walking together in a group, the indicator indicates the direction to their mutual destination. If the directions differ, the indicator will not indicate a direction, but signal a collision instead. This condition is discussed in more detail in step 154. Step 152 checks if there is more than one direction left after the preceding filtering of data in step 150. If there is more than one direction left, too many users try to get directions at that specific indicator 20 at the same time, so the indicator 20 in step 154 displays a symbol, sound and/or message asking the users to use the indicator one at a time. In a specific embodiment, this could be implemented by flashing a red light or by emitting a beep. Some of the people wanting to use the indicator will then have to back off for a moment, or form a short queue. In a different embodiment the indicator 20 sends a message to each of the portable devices 30 causing them to negotiate an access order to the indicator, using indicator 20 as communications controller between them. However, if in step 152 only one direction remains, the indicator 20 checks in step 156 if this direction is known, or if it is an "unknown direction"(generated in step 148). If the direction is known, the indicator displays this direction in step 160. If not, it displays a symbol, sound and/or message informing the user that the location and thus the direction in which to proceed is not known by the indicator.

In other specific embodiments of the present invention, other possible approaches can be taken to reduce the problem of transmitted location code collisions when multiple people try to use the same indicator at once. One approach is to make the transceivers on indicators 20 and portable devices 30 limited in range, e.g., by reducing the power of the transmitted signal. The indicator transceiver range is chosen to be as small as possible while still achieving a data connection to a portable device, e.g., attached to a belt of a user walking by. This limited range ensures that only the users who are actively seeking guidance, that is, the users looking for and walking close to the indicators will be guided. Another approach is to have the transceiver on the indicator broadcast and receive not omnidirectionally but in a narrow beam. In embodiments with the indicator using modulated infrared light for the data transfer, the infrared transceiver broadcasts and receives data in a cone shaped area, the tip of which is in the center of the indicator and the base of which is pointing away from the indicator's transceiver. The cone-shaped sensitive area is a characteristic of most direct-line-of-sight transceivers that this invention utilizes. A vertical baffle manipulates the diameter of the transmission/reception cone. This baffle is similar to the devices astronomers use to limit stray light interference in their observation instruments. In this embodiment of the invention, the baffle restricts indicator activation to a user/ beacon directly above the indicator.

In other further embodiments of the guidance system, more "intelligence" is placed into the portable device instead of the indicator, so that the indicator only provides its position data to the portable device, which uses this information to determine the "optimal" direction to the destination. The portable device then sends a command to the indicator to display that direction. This kind of setup particularly makes sense in embodiments using sophisticated hardware such as a personal digital assistant (PDA) provided by the "power user". An advantage of the more powerful hardware in the portable device is the added flexibility to the guidance system. It can be easier to update the location information in the PDA than in the indicators, and a PDA can allow for more complex interaction with the user. With this kind of portable device, the user is able to enter multiple destinations, and have the portable device calculate the "optimal"(shortest, fastest, etc.) route in which to visit all of them.

A computer runs software that transforms existing but not directly computer readable location information like maps or floor plan drawings into data usable by the guidance system. In a specific embodiment, the user (in this case, the person who sets up and maintains the guidance system) scans a floor plan using a standard personal computer scanner connected to a standard PC. A software program transforms the graphical map data into a computer readable map representation of the area covered by the guidance system. The software suggests where to best place the indicators in order to cover a maximal area with a minimal number of indicators. The user can review and modify these suggestions using the same software. The indicators then are physically installed at the locations found with the aid of the software. The computer calculates a direction dataset for each indicator. The appropriate direction dataset is then transferred to the appropriate indicator. In small area guidance systems, a person carrying a portable computer equipped with an infrared transceiver walking past each indicator may achieve the transfer of the appropriate direction dataset to each indicator. While the user walks past the indicator, the indicator identifies itself to the programming system and receives its direction dataset, e.g. through the already existing infrared transceiver on the indicator.

Advantageously, the indicators according to the above described various embodiments of the present invention do not have to be networked in order for the present system to function. However, in large area guidance systems, the indicators could be networked, and receive location datasets or updates from a central or local server. Even in these embodiments where networked indicators are used, the indicators do not have to be "online" all of the time in order to work—the present guidance system continues to work even during total network failure. There is no central database to fail.

The description above describes specific embodiments, and it is understood that the present invention is not necessarily limited to the described embodiments. Variations or modifications of the described embodiments could be made without departing from the scope of the invention. The scope of the invention is to be limited only by the issued claims.

What is claimed:

1. An infrared guidance system for guiding a user to a selected one of a plurality of locations in a defined area, said system comprising:

a portable device including a device infrared transceiver and an input to receive information corresponding to a selected location in said defined area, said information being selectable by said user; and an indicator, said indicator being physically separate from said portable device and including an indicator infrared transceiver, direction signs, and stored directional information corresponding to the relative direction in a path from said indicator to each of said locations;

wherein said portable device directly communicates said information corresponding to said selected location via said device infrared transceiver to said indicator infrared transceiver of said indicator, and wherein portable device communicating said information corresponding to said selected location to said indicator causes said indicator to access said stored directional information and also causes said indicator to activate the appropriate direction sign to visually guide said user toward said selected location, and wherein said indicator accessing said stored directional information is done without consulting at that time any external computer for directional information.

2. The system of claim 1, wherein said indicator has the capability to calculate said path based on a selected characteristic that optimizes said path, said path including at least one selected location.

3. The system of claim 2, wherein said indicator is one of a plurality of similar indicators, each of said indicators including a respective indicator infrared transceiver, respective direction signs, and respective stored directional information corresponding to the relative direction in a path from said respective indicator to each of said locations.

4. The system of claim 1, wherein said indicator includes a lookup table with said stored directional information.

5. The system of claim 4, wherein said indicator includes an interface whereby said directional information is downloadable to said lookup table from an external computer generating said directional information.

6. The system of claim 5, wherein said interface comprises a PC interface.

7. The system of claim 5, wherein said interface comprises said indicator infrared transceiver and said external computer downloads said stored directional information via infrared transmission prior to said user selecting said location and prior to said indicator being placed into active service at said defined area.

8. The system of claim 1, wherein said indicator includes a location routing algorithm that generates said stored directional information.

9. The system of claim 1, wherein said information corresponding to said selected location in said defined area comprises binary coded information comprising ASCII code or IrDA or other protocol message.

10. The system of claim 1, wherein said portable device continuously communicates said information via said device infrared transceiver to said indicator infrared transceiver of any indicator in reception range.

11. The system of claim 1, wherein said portable device periodically communicates said information via said device infrared transceiver to said indicator infrared transceiver of said indicator.

12. The system of claim 1, wherein said indicator infrared transceiver transmits a periodic infrared beacon signal that triggers said portable device to communicate said information via said device infrared transceiver to said indicator infrared transceiver of said indicator only after said portable device has come into the range of said infrared beacon signal.

13. The system of claim 1, wherein said indicator is mountable to the floor, a wall, or any surface.

14. The system of claim 1, wherein said portable device is part of a pen-like instrument.

15. The system of claim 1, wherein said portable device comprises a card or badge.

16. The system of claim 1, wherein said indicator includes a baffle to restrict infrared communication to a narrow vertical angle.

17. A guidance system for guiding a user to a selected one of a plurality of locations in a defined area, said system comprising;
- a portable device including an infrared device transceiver, an input to receive from said user information corresponding to a selected location in said defined area, and stored directional information;
- an indicator, said indicator being physically separate from said portable device and including an indicator infrared transceiver, direction signs, and indicator location information corresponding to location of said indicator;
- wherein said indicator directly communicates said indicator location information via said indicator infrared transceiver to said device infrared transceiver; wherein said communication of said indicator location information causes said portable device to access said stored directional information, said directional information corresponding to the relative direction in a path from said indicator to said selected location, and wherein said communication of said indicator location information also causes said portable device to send said indicator a signal to activate the appropriate visual direction sign of said indicator corresponding to said relative direction, and wherein said portable device accessing said stored directional information is performed without consulting at that time any external computer.

18. A method for guiding a user to a selected one of a plurality of locations in a defined area, said method comprising the steps of:
- receiving at said portable device input information corresponding to said selected one of said plurality of locations, said selected one being selectable by said user;
- sending an infrared transmission corresponding to said input information, from said portable device to an indicator which is physically separate from said portable device, said indicator including an indicator infrared transceiver, direction signs, and stored directional information corresponding to the relative direction in a path from said indicator to each of said plurality of locations;
- receiving said infrared transmission corresponding to said input information at said indicator when said infrared transmission is within range of said indicator infrared transceiver;
- accessing from within said indicator said stored directional information corresponding to the relative direction in a path from said indicator to said selected one of said plurality of locations, said accessing step occurring without consulting at that time any external computer for directional information; and
- activating the appropriate direction sign of said indicator to visually guide said user toward said selected location;
- and wherein said infrared transmission receiving step causes said accessing and said activating steps to occur.

19. The method of claim 18, further comprising the step of:
- sending an infrared beacon signal, said infrared beacon signal being sent from said indicator infrared transceiver;
- wherein said infrared beacon signal sending step causes said infrared transmission sending step when said portable device comes into range of said indicator infrared transceiver.

20. The method of claim 18, wherein said infrared transmission sending step comprises sending a periodic infrared transmission.

21. The method of claim 18, wherein said infrared transmission sending step comprises sending a continuous infrared transmission.

22. The method of claim 18, further comprising the step of:
- generating said directional information corresponding to the relative direction in a path from said indicator to each of said plurality of locations; and
- downloading into said indicator said directional information corresponding to the relative direction in a path from said indicator to each of said plurality of locations, wherein said downloading step occurs prior to said user selecting a location and prior to said indicator being placed into active service in said defined area.

23. The method of claim 22, wherein said generating step is performed by a computer running software that generates said directional information prior to said indicator being placed into active service in said defined area and prior to said user selecting a location.

24. The method of claim 23, wherein said downloading occurs from said computer via a computer interface of said indicator.

25. The method of claim 23, wherein said downloading occurs from said computer via said indicator infrared transceiver.

26. The method of claim 22, wherein said generating step is performed by said indicator.

27. The method of claim 18, further comprising the step of mounting said indicator to a floor, wall or any surface.

28. The method of claim 18, wherein said directional information is in a lookup table of said indicator.

29. The method of claim 18, wherein said directional information is generated from a location routing algorithm in said indicator.

30. A guidance system for guiding a user to a selected one of a plurality of locations in a defined area, said system comprising;
- a portable device including a device transceiver and an input to receive information corresponding to a selected location in said defined area, said information selectable by said user;
- an indicator, said indicator being physically separate from said portable device and including an indicator transceiver, direction signs, and stored directional information corresponding to the relative direction in a path from said indicator to each of said locations;
- wherein said portable device directly communicates said information corresponding to said selected location via said device transceiver to said indicator transceiver of said indicator, wherein communication of said information causes said indicator to access said stored directional information and also causes said indicator to activate the appropriate direction sign to visually guide said user toward said selected location, wherein said indicator accessing said stored directional information is performed without consulting at that time any external computer.

31. A guidance system for guiding a user to a selected one of a plurality of locations in a defined area, said system comprising;
- a portable device including an infrared device transceiver, an input to receive from said user information corresponding to a selected location in said defined area, and stored directional information;
- an indicator, said indicator being physically separate from said portable device and including an indicator infrared transceiver, direction signs, and indicator location information corresponding to location of said indicator;
- wherein said indicator directly communicates said indicator location information via said indicator infrared transceiver to said device infrared transceiver; wherein said communication of said indicator location information causes said portable device to access said stored directional information, said directional information corresponding to the relative direction in a path from said indicator to said selected location, and wherein said communication of said indicator location information also causes said portable device to send said indicator a signal to activate the appropriate visual direction sign of said indicator corresponding to said relative direction, and wherein said portable device accessing said stored directional information is performed without consulting at that time any external computer.

* * * * *